(12) United States Patent
Son

(10) Patent No.: US 10,372,172 B2
(45) Date of Patent: Aug. 6, 2019

(54) COVER STRUCTURE FOR NOTEBOOK COMPUTER'S BUILT-IN CAMERA

(71) Applicants: STEAGLE CO., LTD, Seoul (KR); Sung Mo Son, Seoul (KR)

(72) Inventor: Sung Mo Son, Seoul (KR)

(73) Assignee: STEAGLE CO., LTD., Seoul (KR)

( * ) Notice: Subject to any disclaimer, the term of this patent is extended or adjusted under 35 U.S.C. 154(b) by 0 days.

(21) Appl. No.: 15/769,696

(22) PCT Filed: Oct. 18, 2016

(86) PCT No.: PCT/KR2016/011694
§ 371 (c)(1),
(2) Date: Apr. 19, 2018

(87) PCT Pub. No.: WO2017/069490
PCT Pub. Date: Apr. 27, 2017

(65) Prior Publication Data
US 2018/0314292 A1    Nov. 1, 2018

(30) Foreign Application Priority Data
Oct. 19, 2015  (KR) .......................... 10-2015-0145576

(51) Int. Cl.
*G06F 1/16* (2006.01)
(52) U.S. Cl.
CPC .......... *G06F 1/1686* (2013.01); *G06F 1/1601* (2013.01); *G06F 1/1605* (2013.01); *G06F 1/1609* (2013.01); *G06F 1/1684* (2013.01)
(58) Field of Classification Search
CPC ..... G06F 1/1686; G06F 1/1684; G06F 1/1605
See application file for complete search history.

(56) References Cited

U.S. PATENT DOCUMENTS

| | | | |
|---|---|---|---|
| 9,389,641 B2* | 7/2016 | Jayetileke | A45C 11/00 |
| 2007/0242948 A1* | 10/2007 | Miramontes | G03B 17/00 |
| | | | 396/448 |
| 2010/0102979 A1* | 4/2010 | Huang | G06F 1/1616 |
| | | | 340/686.1 |
| 2011/0058255 A1 | 3/2011 | Weiss | |
| 2011/0099908 A1* | 5/2011 | Fortmann | G06F 1/1613 |
| | | | 49/373 |
| 2012/0112031 A1* | 5/2012 | Gormick | A45C 11/00 |
| | | | 248/371 |
| 2014/0028777 A1 | 1/2014 | Koberling | |

OTHER PUBLICATIONS

International Search Report for PCT/KR2016/011694 filed on Oct. 18, 2016.

* cited by examiner

*Primary Examiner* — Nidhi Thaker

(57) ABSTRACT

Disclosed is a cover structure for a notebook computer's built-in camera. The cover structure includes a U-shaped lower plate (102) fixedly provided on an upper surface of a monitor frame at a predetermined distance from a camera, and an upper plate (104) slidably coupled to an upper surface of the lower plate (102) so as to open and close the camera, whereby one side of the lower plate is an open structure so that a user is able to easily and stably perform a sliding operation through a wide manipulation range in a horizontal direction, thereby easily physically closing the camera, and the upper and lower plates have a simple structure and shape, thereby providing easy manufacture and assembly of the cover structure.

5 Claims, 6 Drawing Sheets

COVER STRUCTURE FOR NOTEBOOK COMPUTER'S BUILT-IN CAMERA

CROSS-REFERENCE TO RELATED APPLICATIONS

This application is a U.S. National Stage of PCT/KR2016/011694, filed Oct. 18, 2016, which claims the priority benefit of Korean Patent Application No. 10-2015-0145576, filed on Oct. 19, 2015 in the Korean Intellectual Property Office, the disclosures of which are incorporated herein by reference.

TECHNICAL FIELD

The present invention relates generally to a cover structure for a notebook computer's built-in camera. More particularly, it relates to a cover structure for a notebook computer's built-in camera, which is capable of physically preventing a notebook computer's built-in camera from being hacked so that user's private image data is leaked out.

BACKGROUND ART

Generally, a notebook computer (also referred to as "a notebook") has an advantage of good portability, so it is very convenient for a person who is being on a business trip or who do his/her work on the road. Recently, places such as universities, public offices, hotels, etc. have been equipped with many communication systems to which a note-type PC can access to use.

Unlike a desk-top computer which is used on the desk, the notebook computer has a hinged structure consisting of a main body part containing the processor, battery, etc. and a monitor part displaying text or images thereon. The main body part is integrally provided with a keyboard as an input device on a main frame, and the monitor part is integrally provided with a thin display panel fixed to a monitor frame.

In the meantime, a notebook computer having a built-in camera to transmit images to a recipient has been developed disclosed.

A conventional camera device built in a notebook computer is disclosed in Korean Patent Application No. 20-2001-0029212 filed on Sep. 21, 2001. The camera device includes a camera provided at a central portion of a part of a monitor frame of a monitor section opposite to a part coupled to a main section for picking-up an image of a target, wherein one end of a signal line is connected to the camera to transmit an image signal picked-up by the camera to the main section, wherein a monitor-side hole is provided at the central portion of the part of the monitor frame such that one end of the camera is rotatably hinge-coupled into the monitor-side hole, wherein a through-hole is provided in the part of the monitor frame coupled to the main section such that the other end of the signal line is connected to the main section through the through-hole of the monitor frame, and wherein a main section-side hole is provided at a central portion of a part of a main section frame opposite to a part coupled to a monitor section to accommodate the camera therein when the monitor section is folded so as to allow the camera to move towards the main section.

However, the camera device for a notebook computer has no camera cover to protect the camera, causing problems that the camera is easily damaged by external shock, and if so, the cost for replacement of the damaged camera occurs.

Particularly in a conventional notebook computer, a built-in camera has been widely hacked so that a user's private image data is leaked out. As known in the art, there have been approximately 73,000 cameras vulnerable to security features in the world, and the number thereof has been on the rise. Tens of thousands of hacked image files haven been uploaded onto a personal webcam hacking site, 'insecam', from about 120 countries, and among them, many private images from places such as an office, a clothing shop, a swimming pool, a fitness center, etc. have been uploaded.

Such a webcam hacking is conducted by a remote access to a webcam via an IP address if connected to an Internet, or by duping a user into downloading malicious codes via e-mail or from a website if a webcam is connected to a computer. To prevent this hacking, virus vaccine programs should be installed, or otherwise a user should not access suspicious files or links.

However, since problems still exist in such virus vaccine programs which cannot catch all of malicious codes, and it is often difficult to identify such suspicious files or links, a reliable solution is required so as to physically prevent hacking of a notebook computer's built-in camera.

DISCLOSURE

Technical Problem

Accordingly, the present invention has been made keeping in mind the above problems occurring in the related art, and is intended to provide a cover structure for a notebook computer's built-in camera, whereby the cover structure is capable of physically preventing a notebook computer's built-in camera from being hacked so that user's private image data contained in the camera is leaked out.

Further, the present invention serves to provide a cover structure for a notebook computer's built-in camera, the cover structure being capable of preventing a notebook computer's built-in camera from being easily damaged by external shock.

However, the present invention is not limited to those described objectives, but other objectives will be apparently understood by a skilled person in the art from the following description.

Technical Solution

In an aspect, the present invention provides a cover structure for a notebook computer's built-in camera, including: a U-shaped lower plate (102) fixedly provided on an upper surface of a monitor frame at a predetermined distance from a camera; and an upper plate (104) slidably coupled to an upper surface of the lower plate (102) so as to open and close the camera.

Advantageous Effects

As described above, the cover structure for a notebook computer's built-in camera according to the present invention has a simple structure that can open and close the camera in a sliding manner, and has a wide attachment range in a horizontal direction, thereby providing easy manufacture and efficient attachment.

Further, the cover structure for a notebook computer's built-in camera can physically prevent the camera from being hacked so that user's private image data is leaked, and can also prevent both the scratches of the camera from external shock and the contamination of the camera.

MODE FOR INVENTION

Prior to the detailed description of the present invention, it is to be understood that the terminology used herein is for the purpose of describing particular embodiments only and is not intended to limit the scope of the invention that is defined only by the attached claims. Unless otherwise defined, the meaning of all terms including technical and scientific teams used herein is the same as that commonly understood by one of ordinary skill in the art to which the present invention belongs.

It will be further understood that the terms "comprises" and/or "comprising", or "includes" and/or "including" when used in this specification, specify the presence of stated features, regions, integers, steps, operations, elements and/or components, but do not preclude the presence or addition of one or more other features, regions, integers, steps, operations, elements, components and/or groups thereof.

In the meantime, embodiments of the present invention may be combined with other embodiments, unless the context clearly indicates otherwise. Particularly, features indicated to be preferable or advantageous may be combined with other features that are also indicated to be preferable or advantageous. Hereinbelow, embodiments and effects thereof will be described with reference to the accompanying drawings.

Further, in the following description, it is to be noted that, when the functions of conventional elements and the detailed description of elements related with the present invention may make the gist of the present invention unclear, a detailed description of those elements will be omitted.

A description will now be made of preferred embodiments of a cover structure for a notebook computer's built-in camera according to the present invention.

Figure 1:
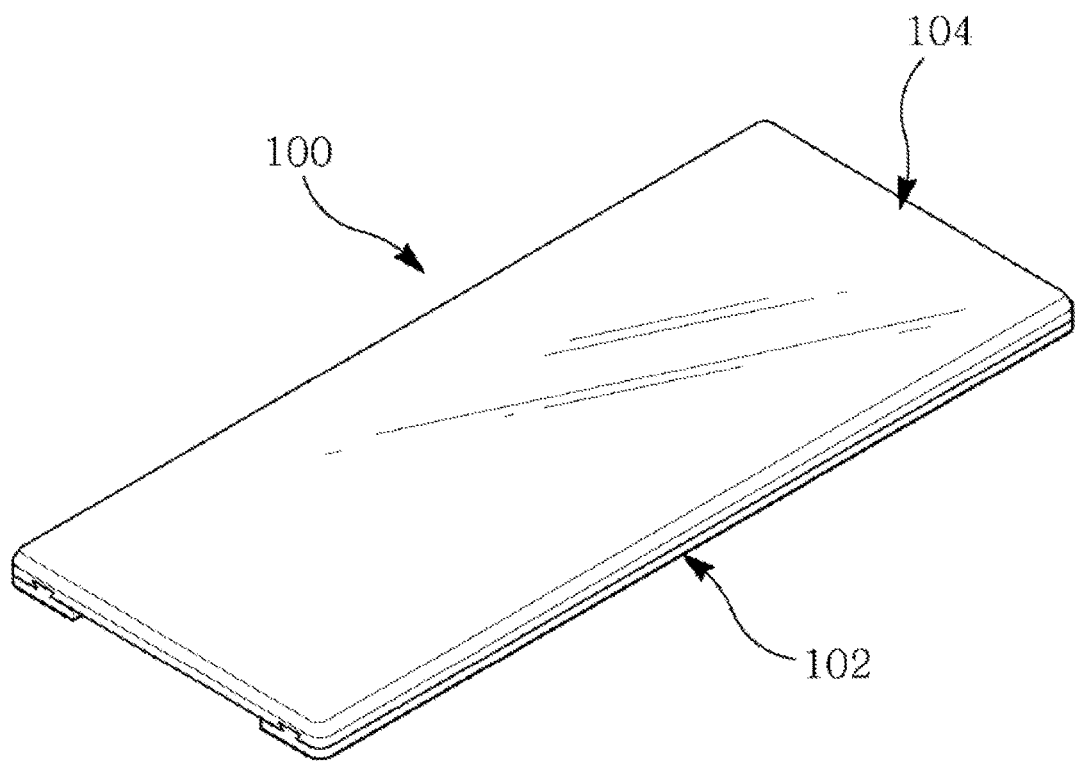
FIG. 1 is a view illustrating a cover structure for a notebook computer's built-in camera according to an embodiment of the present invention.
Figure 2:
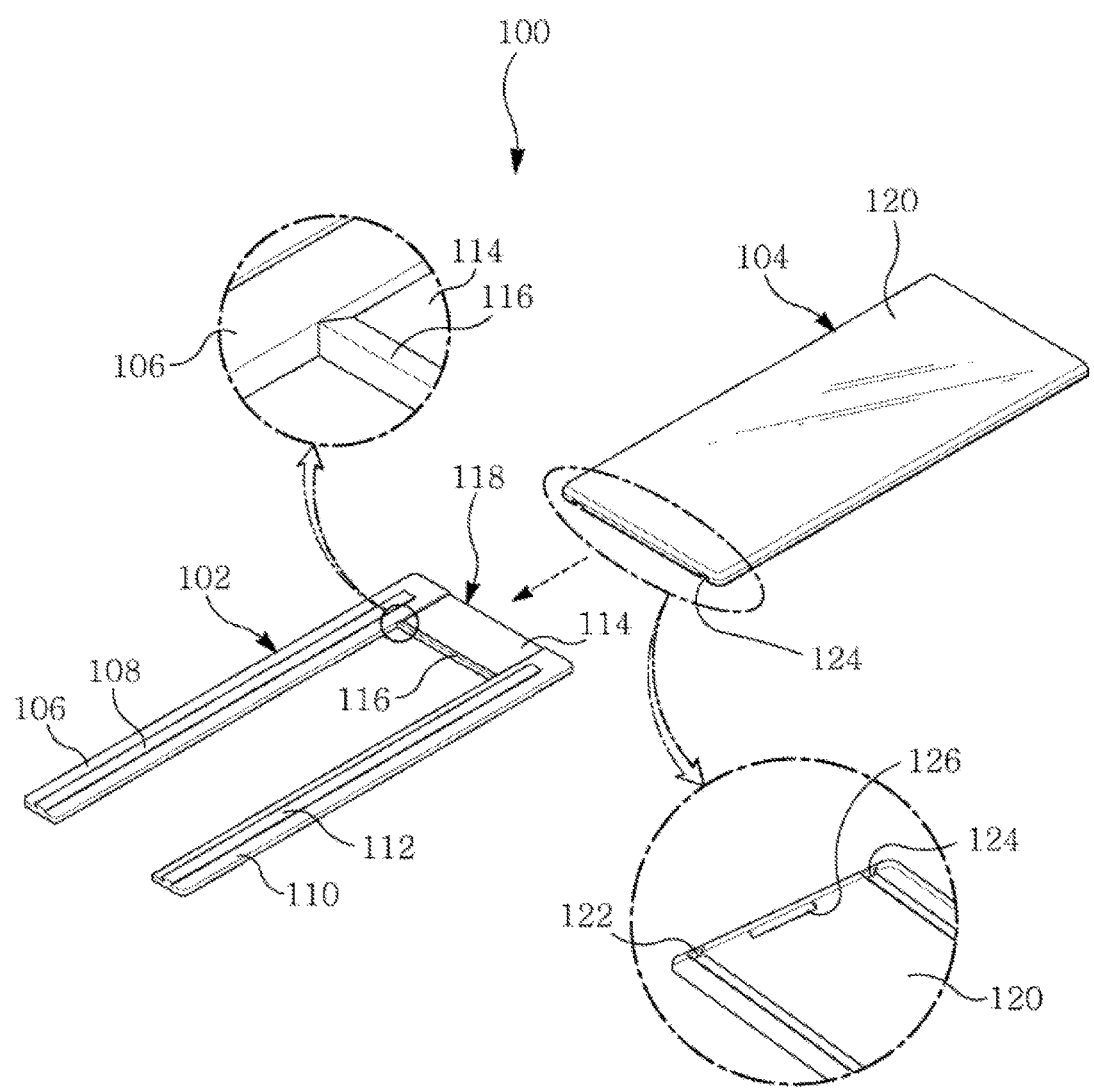
FIG. 2 is an exploded perspective view of the cover structure for a notebook computer's built-in camera illustrated in FIG. 1.
Figure 3:
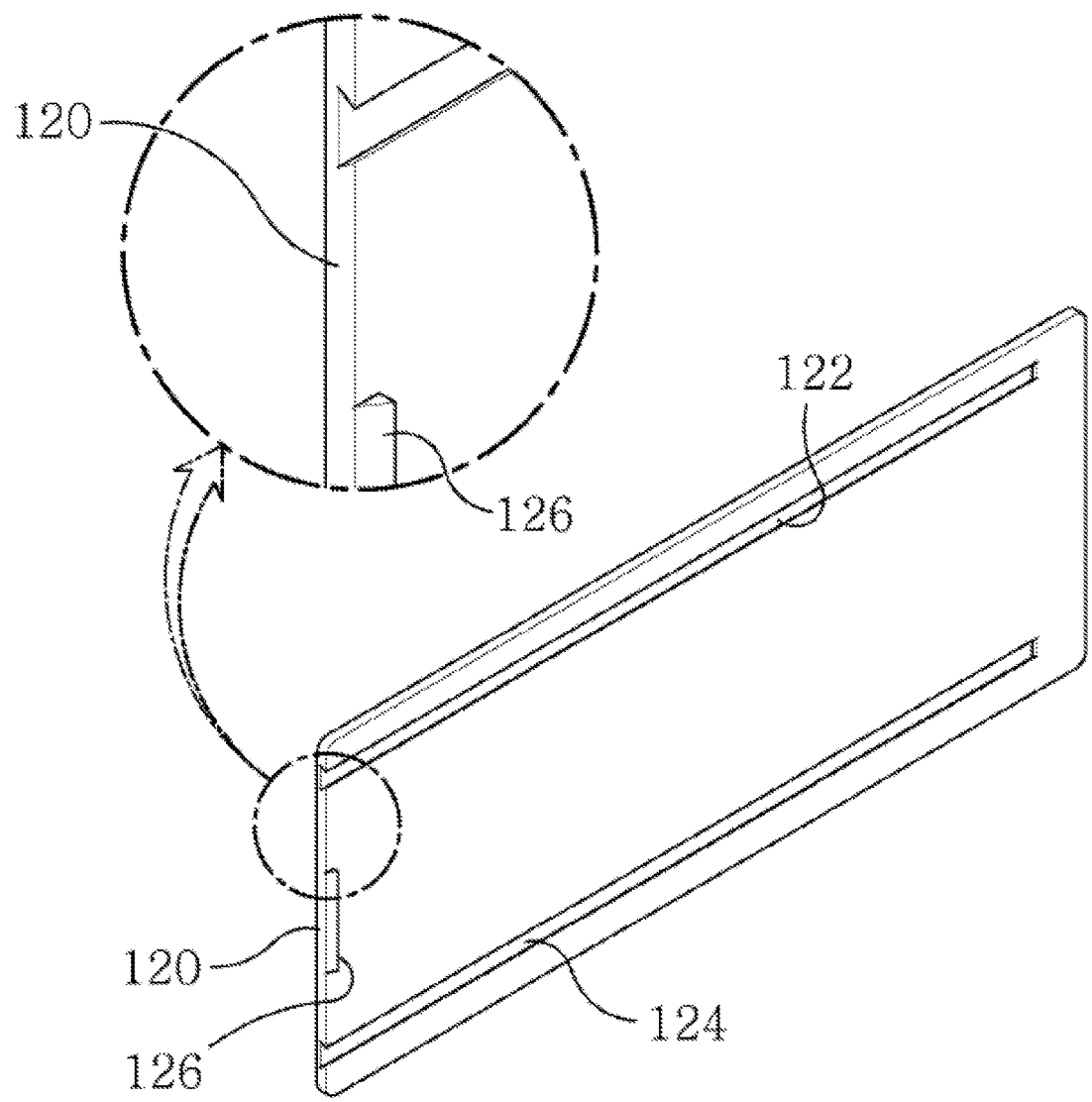
FIG. 3 is an enlarged view of a major part of an upper plate of the cover structure illustrated in FIG. 1.

FIG. 1 is a view illustrating a cover structure for a notebook computer's built-in camera according to an embodiment of the present invention, FIG. 2 is an exploded perspective view of the cover structure for a notebook computer's built-in camera illustrated in FIG. 1, and FIG. 3 is an enlarged view of a major part of an upper plate of the cover structure illustrated in FIG. 1.

As illustrated in FIGS. 1 to 3, the cover structure 100 for a notebook computer's built-in camera includes: a U-shaped lower plate 102 fixedly provided on an upper surface of a monitor frame at a predetermined distance from a camera; and an upper plate 104 slidably coupled to an upper surface of the lower plate 102 to open and close the camera, thereby protecting the camera from external shock or other persons.

The cover structure 100 for a notebook computer's built-in camera according to the present invention has a simple structure that can open and close the camera in a sliding manner, and has a wide attachment range in a horizontal direction, thereby providing easy manufacture and efficient attachment.

The U-shaped lower plate 102 has first and second horizontal parts 106 and 110 spaced apart at a predetermined distance, and a vertical part 118 connected between one-side ends of the first and second horizontal parts.

The first and second horizontal parts 106 and 110 are provided with first and second rails 108 and 112, respectively, extending longitudinally along central lines of upper surfaces thereof in order to allow the upper plate 104 to be slidable along the first and second rails.

The first and second rails 108 and 112 each have a trapezoidal cross-sectional shape whose sectional area increases upwards from the upper surfaces of the first and second horizontal parts 106 and 110. The first and second rails 108 and 112 have a corresponding shape to first and second sliding grooves 122 and 124, which will be described later, so as to prevent the upper and lower plates 104 and 102 from being separated from each other when engaged with the first and second sliding grooves.

Further, the first rail 108 has a shorter length than that of the first horizontal part 106 such that the first rail does not extend up to a distal end of the first horizontal part 106 on the side to which the vertical part 118 is connected. That is, the first horizontal part 106 is provided with a rail-free section on the side to which the vertical part 118 is connected. The above-mentioned configuration of the first rail 108 of the lower plate and the first sliding groove 122 of the upper plate 104 prevents the upper and lower plates 104 and 102, which are in an engaged state, from being further slidable relative to and separated from each other when the upper plate is slid along the lower plate into a closed position.

Similarly, the second rail 112 has a shorter length than that of the second horizontal part 110 such that the second rail does not extend up to a distal end of the second horizontal part 110 on the side to which the vertical part 118 is connected. That is, the second horizontal part 110 is provided with a rail-free section on the side to which the vertical part 118 is connected. The above-mentioned configuration of the second rail 112 of the lower plate and the second sliding groove 124 of the upper plate 104 prevents the upper and lower plates 104 and 102, which are in an engaged state, from being further slidable relative to and separated from each other when the upper plate is slid along the lower plate into a closed position.

The vertical part 118 is fixedly disposed between inner surfaces on one-side ends of the first and second horizontal parts 106 and 110, and has an accommodating recess 114 and a stopper protrusion 116 on one side of an upper surface thereof. The accommodating recess 114 is a planar section having a smaller thickness than the first and second horizontal parts 106 and 110, such that the stopper protrusion 116 protrudes to a height that extends within the thickness of the first and second horizontal parts 106 and 110.

The stopper protrusion 116 may have a convex shape that may or may not have an inclined sidewall. If present, the inclined sidewall is inclined towards a middle portion of the vertical part 118, such that, when the upper plate 104 is initially engaged with the lower plate 102, an engaging protrusion 126 of the upper plate 104 goes over the inclined sidewall of the stopper protrusion 116 and then the upper plate slides along the lower plate, and when the upper plate is reversely slid along the lower plate into an opening position after the engaging protrusion goes over the inclined sidewall, the upper plate 104 is prevented from being completely separated from the lower plate 102.

The U-shaped lower plate 102 is provided with an adhesive layer 128 on an entire or partial portion of a lower surface thereof, i.e. an opposite surface to the surface on which the first and second rails 108 and 112 are formed, to allow the lower plate to be attached to a camera-contained electric device including a notebook computer.

The upper plate 104 is formed into a cover section 120 having the first and second sliding grooves 122 and 124, and the engaging protrusion 120.

The first sliding groove 122 is provided along a side portion of a bottom surface of the cover section 120, such that the first sliding groove is fitted around and slid along the first rail so that the cover section 120 can slid along the first rail 108.

The second sliding groove 124 is provided along an opposite side portion of the bottom surface of the cover section 120 in parallel with the first sliding groove 122, such that the second sliding groove is fitted around and slid along the second rail so that the cover section 120 can slid along the second rail 112.

The first and second sliding grooves 122 and 124 each have a trapezoidal cross-sectional shape whose sectional area increases from the bottom surface towards an upper surface of the cover section 120. The cross-sectional shape of the first and second sliding grooves 122 and 124 corresponds to that of the first and second rails 108 and 112 so as to prevent the upper and lower plates 104 and 102 engaged with each other from being separated from each other.

Further, the first sliding groove 122 has a shorter length than that of the cover section 120, such that one end section thereof is open and the other end section thereof is closed. The closed end section of the first sliding groove 122 corresponds to the rail-free section (in which the first rail 108 is not provided) of the first horizontal part 106, thereby preventing the upper and lower plates 104 and 102, which are in an engaged state, from being further slidable relative to and separated from each other when the upper plate is slid along the lower plate into a closed position.

Similarly, the second sliding groove 124 has a shorter length than that of the cover section 120, such that one end section thereof is open and the other end section thereof is closed. The closed end section of the second sliding groove 124 corresponds to the rail-free section (in which the second rail 112 is not provided) of the second horizontal part 112, thereby preventing the upper and lower plates 104 and 102, which are in an engaged state, from being further slidable relative to and separated from each other when the upper plate is slid along the lower plate into a closed position.

The engaging protrusion 126 protrudes from one side of the bottom surface of the cover section 120 between the first and second sliding grooves 122 and 124, such that the engaging protrusion is abutted against the stopper protrusion 116 and thus prevents the further sliding of the cover section 120 into a separated position when the upper plate engaged with the lower plate is slid into an opening position.

The engaging protrusion 126 may have a convex shape that may or may not have an inclined sidewall. If present, the inclined sidewall is inclined opposite to a middle portion of the cover section 120, i.e. opposite to the stopper protrusion 116 of the lower plate 102, such that, when the upper plate 104 is initially engaged with the lower plate 102, the engaging protrusion 126 of the upper plate 104 goes over the inclined sidewall of the stopper protrusion 116 and then the upper plate slides along the lower plate, and when the upper plate is reversely slid along the lower plate into an opening position after the engaging protrusion goes over the inclined sidewall, the upper plate 104 is prevented from being completely separated from the lower plate 102.

In the meantime, the first horizontal part 106 and the first rail 108, the second horizontal part 110 and the second rail 112, and the accommodating recess 114 and the stopper protrusion 116 respectively are preferably formed into a single piece.

Further, the first and second sliding grooves 122 and 124, and the engaging protrusion 126 are preferably integrated with the cover section 120.

The U-shaped lower plate 102 and the upper plate 104 are formed from aluminum.

The assembly and use of the cover structure for a notebook computer's built-in camera having the above-mentioned configuration will now be described.

The U-shaped lower plate 102 and the upper plate 104 will be assembled into the cover structure 100 according to the following procedure. As illustrated in FIG. 2, the U-shaped lower plate 102 and the upper plate 104 are first positioned such that the open end section of the first and second sliding grooves 122 and 124 of the upper plate 104 is aligned with the vertical part 118 of the lower plate 102. Then, the aligned U-shaped lower plate 102 and the upper plate 104 are slid relative to each other such that the engaging protrusion 126 of the upper plate 104 goes over the stopper protrusion 116 of the lower plate 102 and then the upper and lower plates are slid relative to each other to complete assembly.

After the assembly of the upper and lower plates 104 and 102 is completed, the upper and lower plates are prevented from being separated from each other when they are slid relative to each other into an open or closed position of the cover structure by the configuration of the stopper protrusion 116 and the engaging protrusion 126 and the configuration of the first and second rails 108 and the 112 and the first and second sliding grooves 122 and 124.

Figure 4:
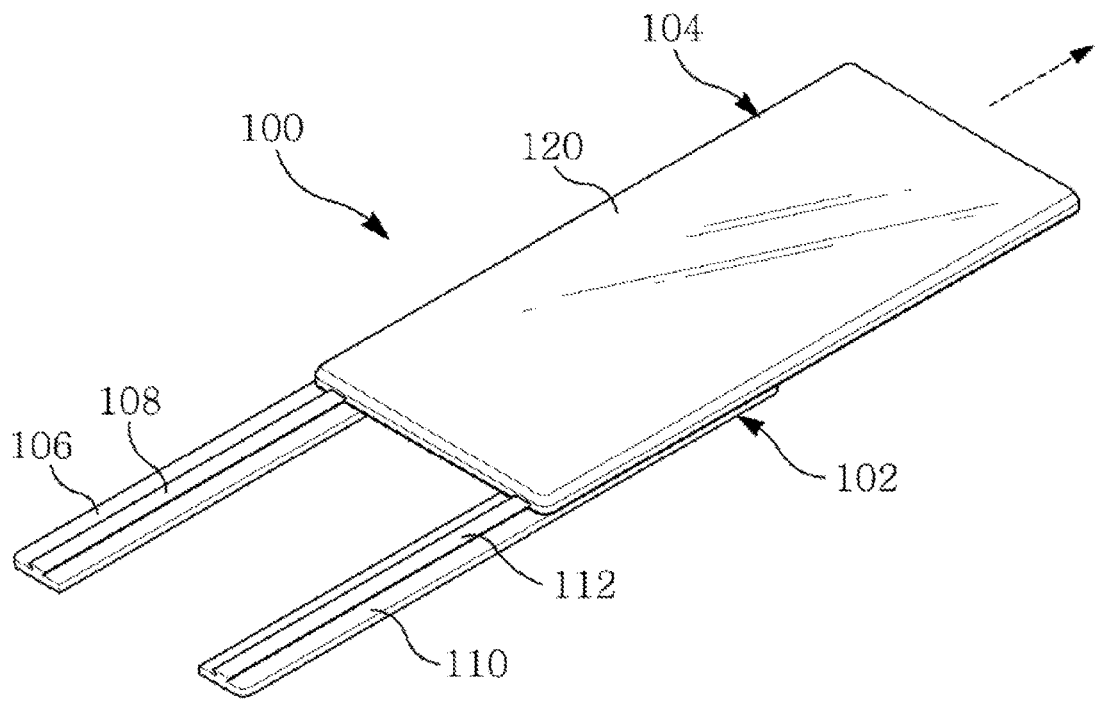
FIG. 4 is a view illustrating a state of the cover structure being installed onto a notebook computer.

After the assembly of the cover structure 100 for a notebook computer's built-in camera is completed, the cover structure 100 is attached to one side of an upper portion of the monitor frame 200 as illustrated in FIG. 4.

Here, the camera 300 is disposed between the first and second horizontal parts 106 and 110 of the U-shaped lower plate 102.

Figure 5:
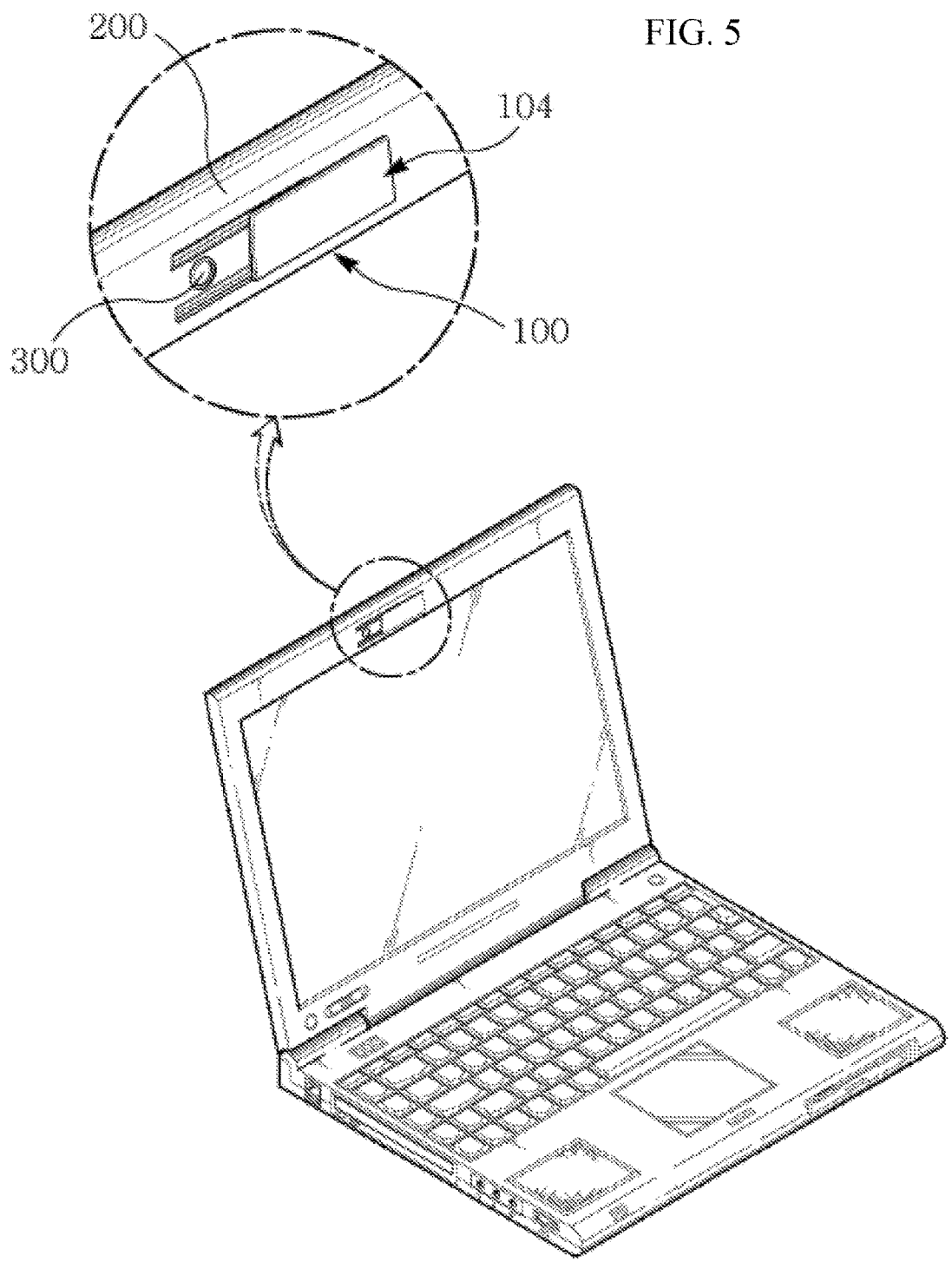
FIG. 5 is a view illustrating an assembled state of upper and lower plates of the cover structure illustrated in FIG. 1.

When a user attempts to use the camera, he/she touches and pushes the upper plate 104 to the right side with his/her finger as illustrated in FIG. 5.

When the upper plate 104 is pushed to the right side, the cover section 120 is slid towards the right side along the first and second rails 108 and 112, so that the camera 300 is finally opened.

Then, the engaging protrusion 126 is abutted against the stopper protrusion 116.

When the engaging protrusion 126 is abutted against the stopper protrusion 116, the cover section 120 cannot be further slide towards the right side.

Conversely, when the upper plate 104 is pushed to the left side, the cover section 120 is slid towards the left side along the first and second rails 108 and 112, so that the camera 300 is finally closed by the cover section 120.

A manufacturing process of the cover structure for a notebook computer's built-in camera will now be described.

In the manufacture of the upper plate 104, the upper plate is first machined into a shape having an engaging protrusion using a computer numerical control (CNC) machining method, and the resulting upper plate is secondarily machined to have sliding grooves therein using the CNC machining method, thereby forming a final upper plate.

In the case of the lower plate 102, similarly, the lower plate is machined into a U-shaped shape having rails and a stopper protrusion using the CNC machining method.

After the CNC machining of the upper and lower plates 104 and 102, the machined upper and lower plates are assembled as described before, thereby forming a final cover structure for a notebook computer's built-in camera.

Here, in the manufacture of the upper and lower plates 104 and 102, an anodizing process may be carried out in order to provide corrosion resistance, gloss and texture, and a variety of colors to the surface of the plates. In the anodizing process, when a voltage is applied to the upper and lower plates 104 and 102 made of aluminum and functioning as an anode, the aluminum surface is oxidized to form an aluminum oxide film thereon due to oxygen produced from the anode. Since an oxidized aluminum product has a problem of brittleness and easy fracture, such an anodizing process assists in improving wear resistance and corrosion resistance through the formation of the aluminum oxide film. Further, when the aluminum oxide film is formed, the color can be selected by controlling the kind of oxidizing solutions and oxidizing time.

Figure 6:
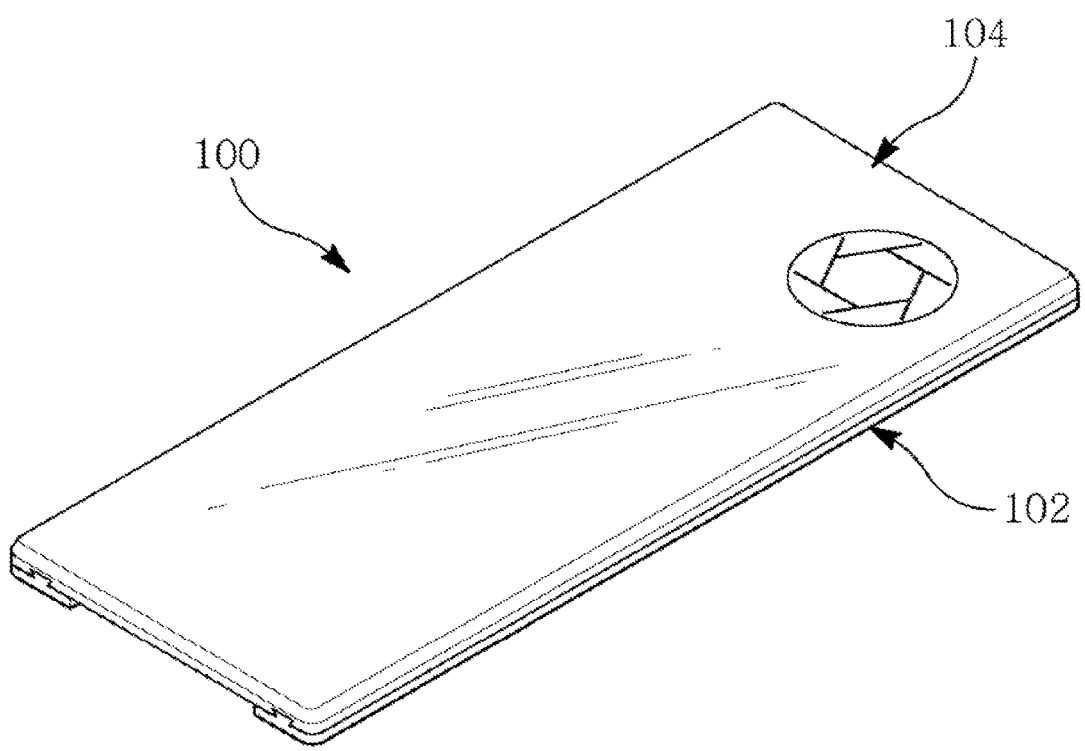
FIG. 6 is a view illustrating a state in which a logo is put on the upper plate of the cover structure.

In the meantime, as illustrated in FIG. 6, a logo may be put on one side of the upper plate.

The cover structure for a notebook computer's built-in camera according to the present invention has a configuration in which one side of the lower plate is an open structure so that a user can easily and stably perform a sliding operation through a wide manipulation range in a horizontal direction, thereby easily physically closing the camera, and in which upper and lower plates have a simple structure and shape, thereby providing easy manufacture and assembly of the cover structure.

The detailed description of the invention is provided merely for the purpose of explaining embodiments of the invention, and is not intended to limit the technical scope of the invention defined by the following claims.

Therefore, an ordinary skilled person in the art will understand that a variety of changes and equivalent embodiments can be made from the foregoing description. The technical scope of the invention should thus be defined by the technical ideas of the following claims.

DESCRIPTION OF REFERENCE NUMERALS

100: Cover structure for a notebook computer's built-in camera
  102: U-shaped lower plate
  104: Upper plate
  106: $1^{st}$ horizontal part
  108: $1^{st}$ rail
  110: $2^{nd}$ horizontal part
  112: $2^{nd}$ rail
  114: Accommodating recess
  118: Vertical part
  120: Cover section
  122: $1^{st}$ sliding groove
  124: $2^{nd}$ sliding groove
  126: Engaging protrusion

The invention claimed is:

1. A cover structure for a notebook computer's built-in camera, the cover structure comprising:
a U-shaped lower plate fixedly provided on an upper surface of a monitor frame at a predetermined distance from a camera; and an upper plate slidably coupled to an upper surface of the lower plate so as to open and close the camera;
a vertical part provided on one side of an upper surface thereof with an accommodating recess having a thickness smaller than a thickness of first and second horizontal parts; and
a stopper protrusion provided on another side of the upper surface thereof,
wherein the U-shaped lower plate has the first and second horizontal parts and spaced apart at a predetermined distance, and the vertical part connected between one-side ends of the first and second horizontal parts, and
wherein the first and second horizontal parts are provided with first and second rails, respectively, extending longitudinally along central lines of upper surfaces thereof.

2. The cover structure according to claim 1, wherein the upper plate comprises:
a cover section covering the camera;
a first sliding groove provided along a side portion of a bottom surface of the cover section to accommodate the first rail therein to allow the cover section to slide along the first rail; and
a second sliding groove provided along an opposite side portion of the bottom surface of the cover section at a predetermined distance from the first sliding groove to accommodate the second rail therein to allow the cover section to slide along the second rail.

3. The cover structure according to claim 2, wherein the upper plate further comprises:
an engaging protrusion protruding from one side of the bottom surface of the cover section between the first and second sliding grooves and such that, when the cover section slides, the engaging protrusion is abutted against the stopper protrusion and prevents the sliding of the cover section, thereby preventing the cover section from being separated from the lower plate.

4. The cover structure according to claim 3, wherein the first rail has a shorter length than a length of the first horizontal part such that the first rail does not extend up to a distal end side of the first horizontal part to which the vertical part is connected,
wherein the second rail has a shorter length than a length of the second horizontal part such that the second rail does not extend up to a distal end side of the second horizontal part to which the vertical part is connected,
wherein the first sliding groove has a shorter length than a length of the cover section such that one end side of the upper plate is open and the other end side of the upper plate is closed, and
wherein the second sliding groove has a shorter length than a length of the cover section such that one end side of the upper plate is open and the other end side of the upper plate is closed.

5. The cover structure according to claim 4, wherein the stopper protrusion and the engaging protrusion have a convex shape having a vertical sidewall or an inclined sidewall.

* * * * *